(No Model.) 7 Sheets—Sheet 2.

J. B. LINN.
ELECTRIC CONDUIT RAILWAY.

No. 565,624. Patented Aug. 11, 1896.

Witnesses
Louis P. Abell
H. J. Edwards

Inventor
John B. Linn (No Model.) 7 Sheets—Sheet 3.
J. B. LINN.
ELECTRIC CONDUIT RAILWAY.
No. 565,624. Patented Aug. 11, 1896.
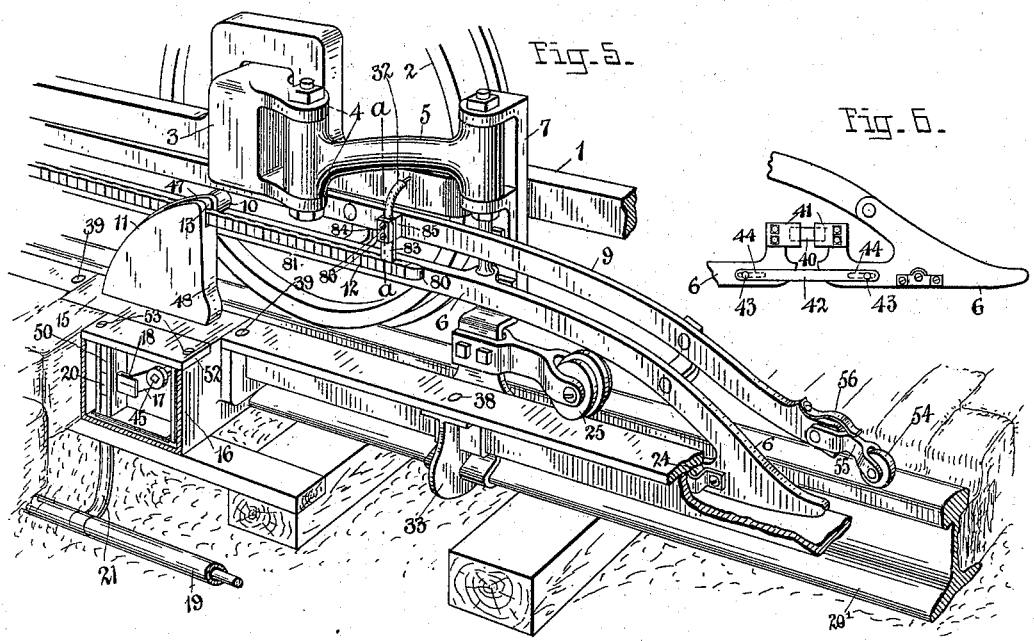
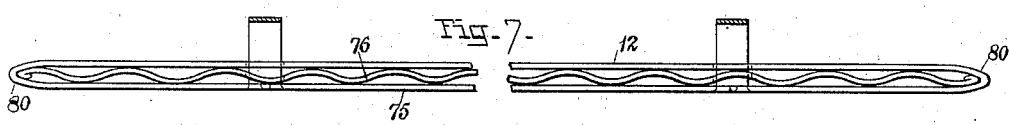
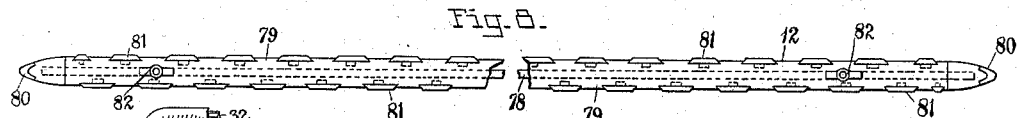
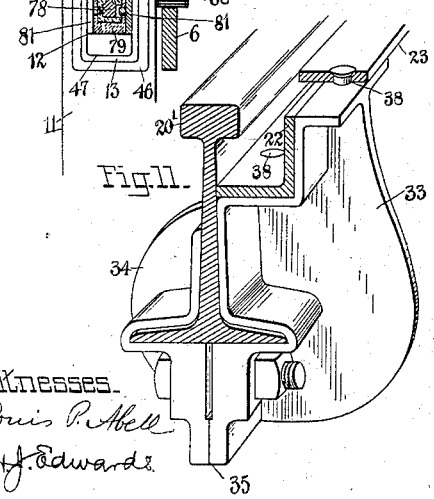
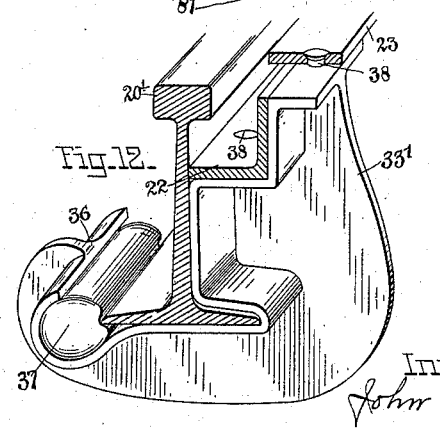
Witnesses
Louis P. Abell
A. J. Edwards
Inventor
John B. Linn (No Model.)  7 Sheets—Sheet 4.
J. B. LINN.
ELECTRIC CONDUIT RAILWAY.
No. 565,624.  Patented Aug. 11, 1896.
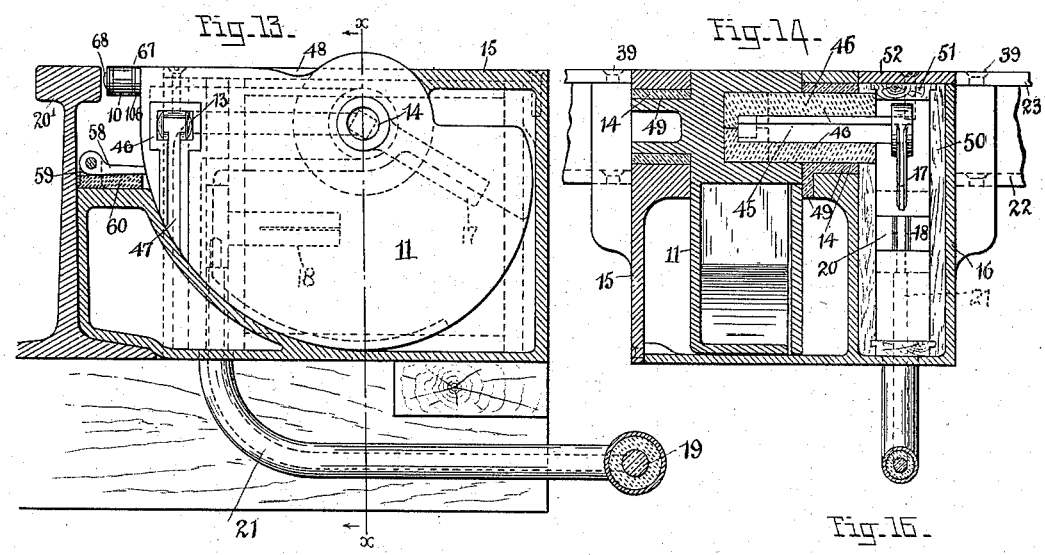
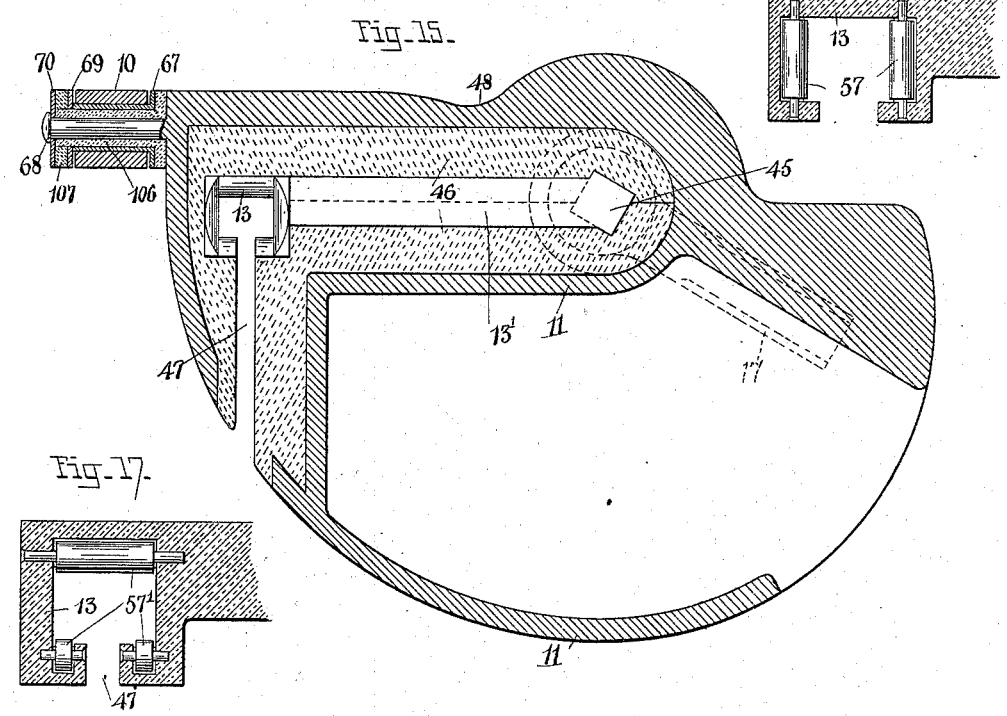
Witnesses.
Louis P. Abell
H. J. Edwards
Inventor.
John B. Linn (No Model.) 7 Sheets—Sheet 5.
J. B. LINN.
ELECTRIC CONDUIT RAILWAY.
No. 565,624. Patented Aug. 11, 1896.
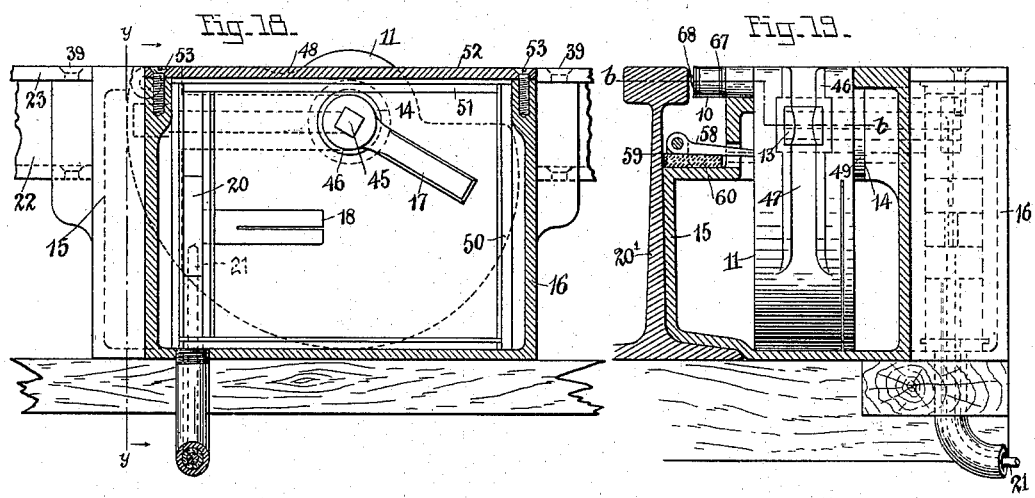
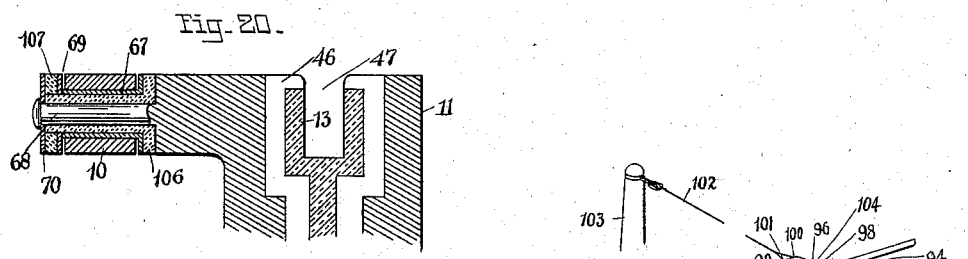
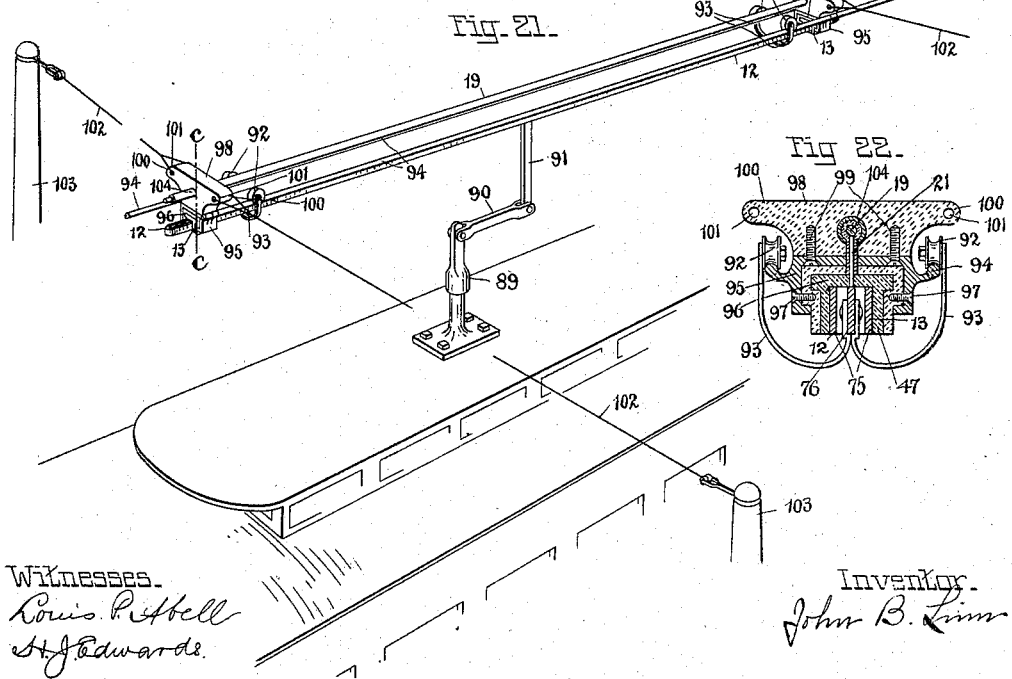
Witnesses.
Louis P. Abell
A. J. Edwards.
Inventor.
John B. Linn (No Model.) 7 Sheets—Sheet 6.
J. B. LINN.
ELECTRIC CONDUIT RAILWAY.
No. 565,624. Patented Aug. 11, 1896.
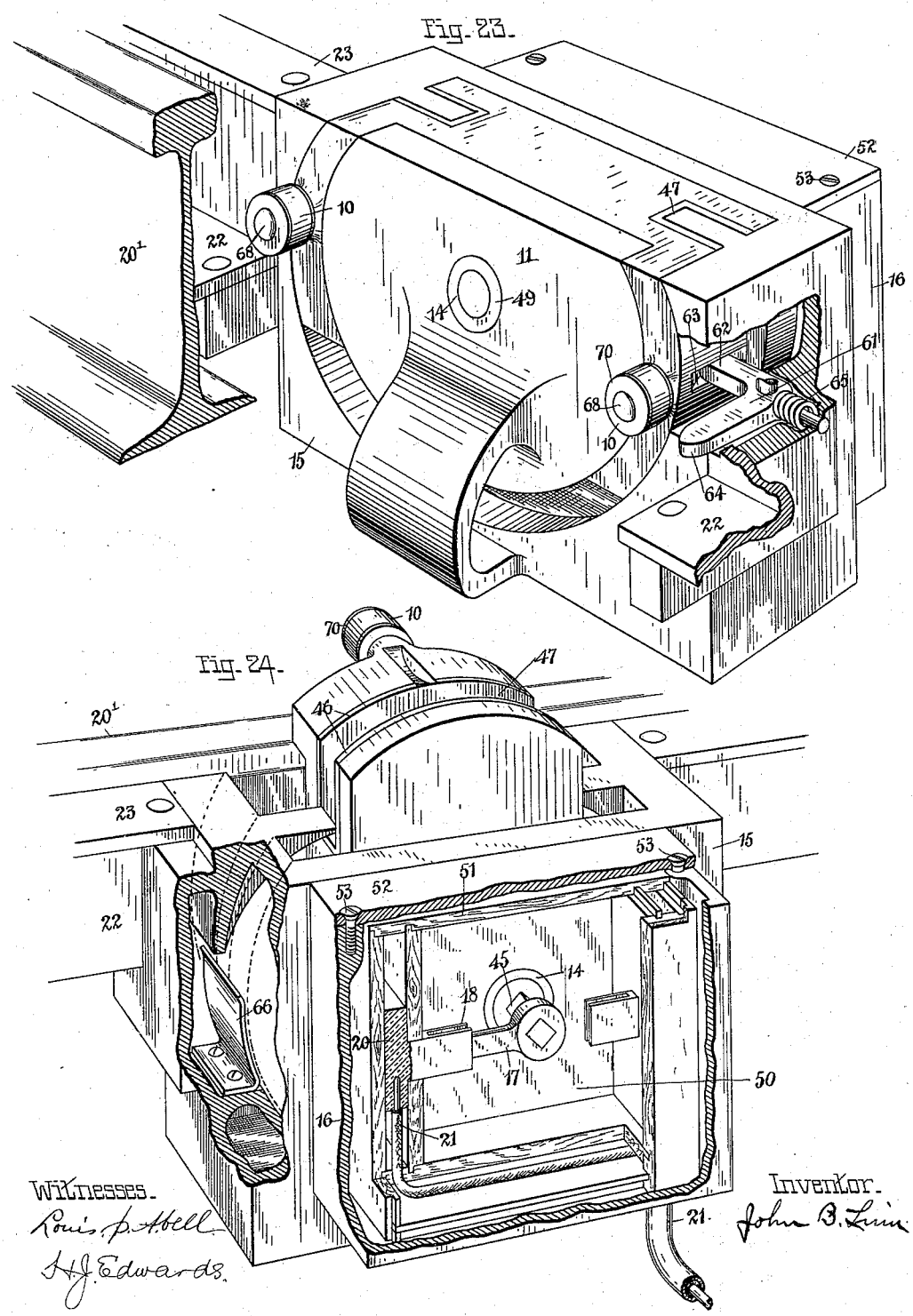

(No Model.)  7 Sheets—Sheet 7.

J. B. LINN.
ELECTRIC CONDUIT RAILWAY.

No. 565,624.  Patented Aug. 11, 1896.

Witnesses  
Louis P. Abell  
H. J. Edwards

Inventor  
John B. Linn

UNITED STATES PATENT OFFICE.

JOHN B. LINN, OF CLEVELAND, OHIO, ASSIGNOR OF ONE-HALF TO O. S. KELLY, OF SPRINGFIELD, OHIO.

ELECTRIC CONDUIT RAILWAY.

SPECIFICATION forming part of Letters Patent No. 565,624, dated August 11, 1896.

Application filed January 11, 1895. Serial No. 534,521. (No model.)

*To all whom it may concern:*

Be it known that I, JOHN B. LINN, a citizen of the United States, residing at Cleveland, in the county of Cuyahoga and State of Ohio, have invented certain new and useful Improvements in Electric Conduit Railways; and I do hereby declare that the following is a full, clear, and exact description of the invention, which will enable others skilled in the art to which it appertains to make and use the same.

The object of my invention is to provide means whereby an electric current may be collected at points above the surface of and along a railway-track as the car passes such points, thereby furnishing a continuous supply of current for the propulsion of a vehicle. To this end the invention comprises, among other things, a series of standards and means for raising them above the surface of the track and into connection with the current as the car approaches, from the top of which the current is collected by suitable means attached to the car, so that when the standards are raised they are drawn into contact with the main current, and when they are lowered to the surface of the track they are thrown out of contact with the current, and said standards being arranged at such distance apart along the surface of the track that the one just passed by the car will not be thrown out of contact until the next in order is thrown into contact, the whole constructed as hereinafter more fully described, and fully set forth in the claims.

Figure 1:
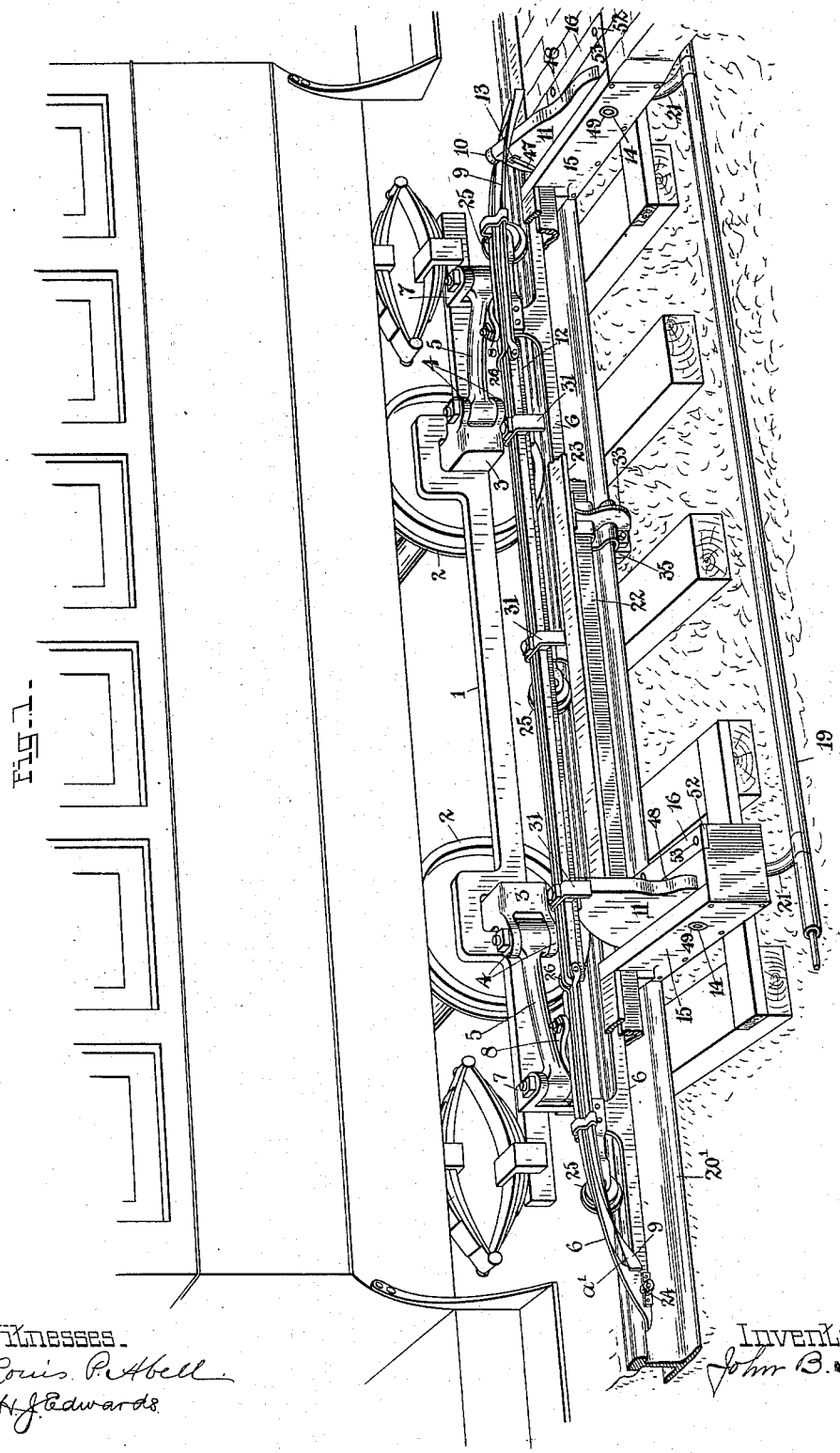
Figure 2:
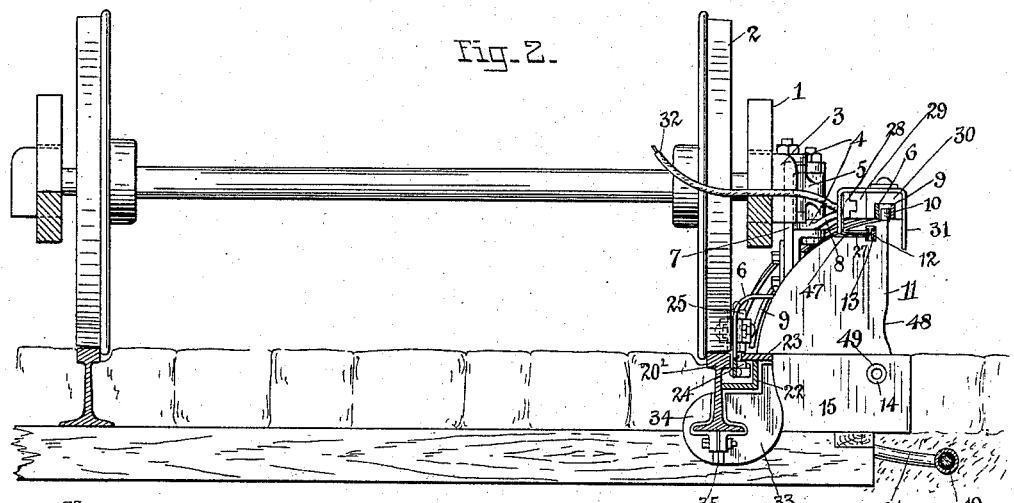
Figure 3:
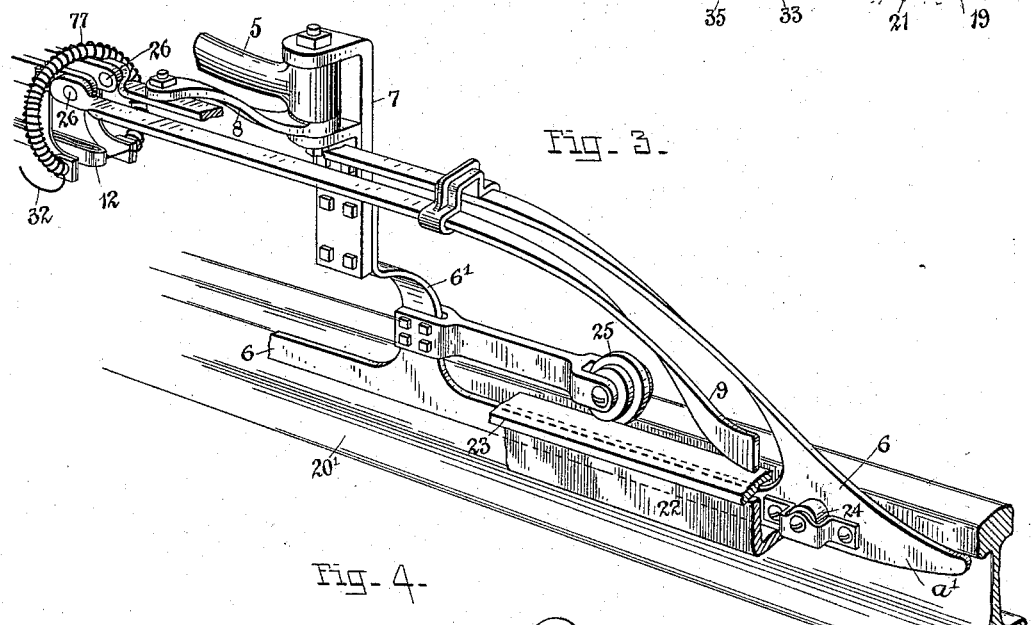
Figure 4:
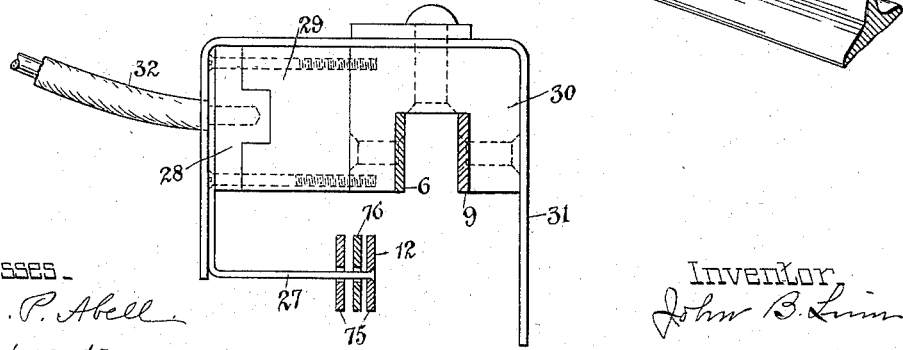
Figure 25:
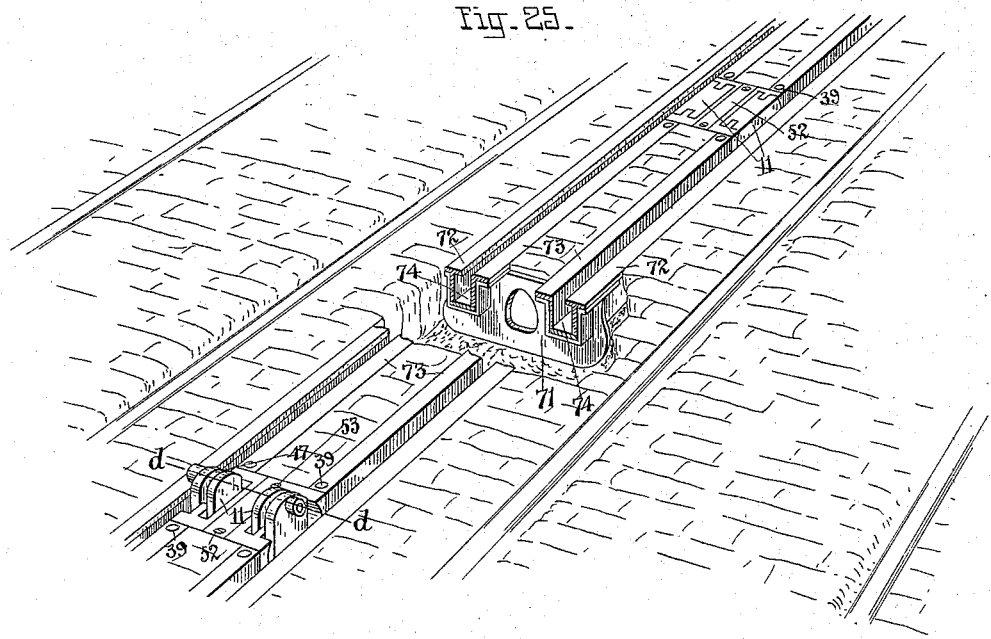
Figure 26:
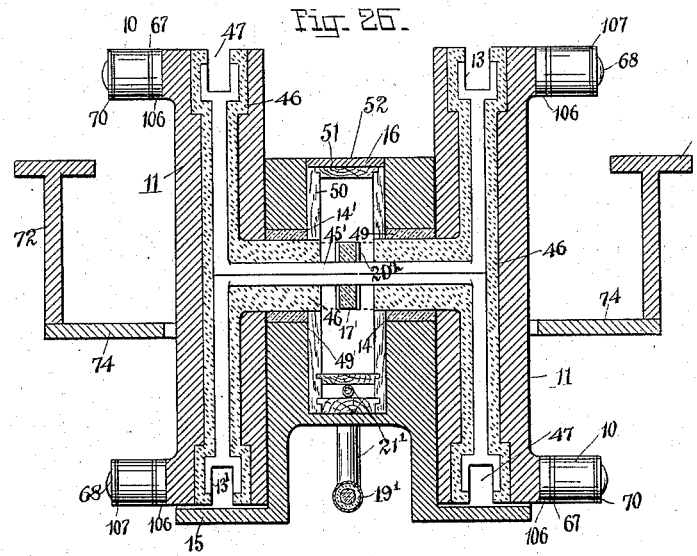

Figure 1 is a perspective view of a car and a track with parts of the surface of the track broken away to more clearly disclose the parts of my invention. Fig. 2 is a cross-section of a truck and the track at a point which discloses the current-collecting mechanism. Fig. 3 is a perspective view of a standard raising and lowering device adapted to standards that are raised on an axis parallel to the track. Fig. 4 is an enlarged detail of means for holding the guide-pieces and collector shown at the top and right of Fig. 2. Fig. 5 is a perspective view of a modification of standard raising and lowering device adapted to standards which are raised on an axis at right angles to the track. Fig. 6 is a detail of the nose of the raising and lowering device. Fig. 7 is a plan view of one form of collector. Fig. 8 is a plan view of an alternative or modified form of collector. Fig. 9 is a cross-section on a line corresponding to *a a*, Fig. 5, enlarged. Fig. 10 is an enlarged detail of one end of collector shown in Fig. 8. Fig. 11 is a perspective view showing construction of a cross-section of a rail and the slot by its side. Fig. 12 shows a modification of the construction shown in Fig. 11, as hereinafter fully described. Fig. 13 is a sectional elevation of one form of contact-box and showing the standard therein. Fig. 14 is a cross-section on line *x x*, Fig. 13. Fig. 15 is an enlarged sectional elevation of the standard shown in Figs. 13 and 14. Figs. 16 and 17 show alternative or modified forms of the C-shaped contact mechanism shown in Fig. 15. Fig. 18 is a sectional elevation of an alternative form of contact-box, as hereinafter fully described. Fig. 19 is a sectional elevation on line *y y*, Fig. 18. Fig. 20 is an enlarged sectional elevation of the top of the standard on line *b b*, Fig. 19, and showing a U-shaped point of contact and friction-roller. Fig. 21 is a perspective view of a modification of my invention adapted for collecting the current above the top of the car. Fig. 22 is an enlarged cross-section on a line corresponding substantially to line *c c*, Fig. 21. Fig. 23 is a perspective view of an alternate or modified form of contact-box with certain parts broken away to show features of construction. Fig. 24 is a perspective view from rear of contact-box shown in Fig. 23, with certain parts broken away to show construction. Fig. 25 is a perspective view of a section of a double track, showing twin or double conduit. Fig. 26 is an enlarged cross-section on a line corresponding to *d d*, Fig. 25.

In the accompanying drawings similar figures of reference indicate corresponding parts.

1 represents the side bar of a car-truck. 2 are the wheels, and 3 are the axle-boxes. The axle-boxes or journals are provided with lugs 4, between which, at either end of the truck, are pivoted the swinging arms 5. The arm 5 is designed to support the runner 6, and this is done by means of the angle-piece 7, hinged to the outer end of said arm and arm 8, to which it is pivotally secured, the runner or nose 6 being rigidly fixed to the angle-piece 7.

9 is a guide running parallel throughout its length to the upper part of the runner 6, between which the lift-roller 10 is designed to travel. The roller 10 is secured to the top of the movable standard 11.

12, Figs. 7 and 8, is a collector constructed of suitable conductive material and designed to engage with the C-shaped contact-block 13 in the top of the standard 11, Figs. 13 and 14. The standard swings upon the packed bearing 14, Fig. 14, in the box 15, which is built into the side of the track. The C-shaped contact-piece 13 in the top of the standard 11 is connected solidly to the axis 45 of said standard by the arm 13, which axis extends through the bearing 14 into the inner contact-box 16. The blade 17 is secured on the inner end of the axis 45 in the contact-box and is designed to be thrown between the springs 18, Fig. 5, in the said box by the raising of the standard 11, thereby forming a solid contact with the main current carried by the cable 19 and connection or tap 21, said blade being withdrawn from the springs when the standard is lowered, thus rendering neutral all parts of such box except the springs 18, which form part of the contact-block 20 and which is solidly connected to the main cable 19 by the tap 21, Fig. 13.

The runner 6 is designed to travel in a slot preferably constructed in what is called the "devil-strip" between a double track, and one side of said slot is formed by the rail 20' and the other side and bottom by the angle-strip 22, above which and projecting over the side of the slot is the strip 23, flush with the surface of the track, but leaving a free space between it and the rail 20'. The roller 24, secured to the side of the runner 6, is designed to travel along on the under side of the cover or strip 23 and keep the runner in place. I also provide flanged rollers 25, secured to the standards 6' of the runners 6 at their respective ends, the flanges running in the said slots and serving further as guides and carriers. I also secure in like manner one or more rollers 25 at suitable points between the ends of the runner 6, as seen in Fig. 1, and said rollers serve to guide the runner, which is slightly flexible throughout its length, around any curves or other irregularities in the track.

It will be seen in Figs. 1 and 3 that the form of runner there shown is constructed in the shape of a plowshare at each end and is designed to raise and lower a standard having its axis parallel to the track, as shown in Fig. 1. It will also be seen that the plowshare ends of the runner 6 present a surface at their upper parts at right angles to that which travels from the slot, and it will be found necessary to twist said upper parts of runner at a point shown at 26, in order that the upper part may follow around the curves or turns of the track on a line parallel with the lower part of said runner. It will also be seen that the guide 9, between which and the top part of the runner 6 the roller 10 is designed to travel, conforms throughout its length to the top part of runner 6, having its plow-share ends or extremities $a'$ (shown in Figs. 1 and 3) constructed to travel just above the surface of the track and designed to lower the standard 11 to the surface of track when the car has passed said standard. In case, however, the guide 9 should fail for any reason to lower the standard 11 to the proper level, I provide a roller 54, loosely secured to the end of the guide 9 by the link 55, which is held downward by the spring 56, secured near the end of the guide 9. When the standard 11 is raised by the runner 6 and the roller 10 is guided between the top part of said runner and the guide 9, the collector 12, Fig. 2, must be held in such a relation to the runner and guide that it will form a solid contact with the C-shaped contact-piece 13 in the upper part of the standard 11, and for that purpose I provide a right-angled strip 27, Fig. 4, at one or more points between the ends of the collector, secured at one end to the collector and at the other end, Figs. 2 and 4, to the block 28, firmly secured to the insulating-block 29, said strip and blocks being secured to an insulating-block 30, fixed, as shown, to the runner 6 and guide 9. The insulating-strip 31 is secured to the block 30 and overlaps the collector 12 on the outside and conducting-strip 27 and is designed to prevent arcing or other loss of current from the collector 12, strip 27, and conducting-block 28. The block 28 is tapped by an insulated wire 32, leading to the propelling mechanism of the car, and carries the current to said mechanism or motor.

In Figs. 11 and 12 I show a method of constructing the slot and means for clamping the angle-strip 22 and the top strip 23 firmly together in their position on the side of the rail. This mechanism consists of a two-part clamp comprising bracket-piece 33, and a clamp-section 34, placed on the opposite side of the rail, Fig. 11, each having an abutting face at the lower part and bolted together below the rail, thereby firmly grasping the rail near the bottom of the slot.

Fig. 12 shows an alternative form of bracket 33', having a lip 36 formed on its inner side and provided with a wedge 37, driven between said lip and the inner side of the rail, thereby firmly securing said bracket to the rail. The projections 38 on the brackets are designed to fit into corresponding holes in the strips 22 and 23, respectively, and are riveted down upon said strips. Similar projections 39 are formed upon either side of the contact-box 15 and are adapted to fit into holes in the ends of the strips 22 and 23, and are in like manner riveted down upon said strips. From this description it will be seen that I have provided a continuous and substantial slot for the runner 6, the end or nose of which runner is so formed as to expel all dirt or foreign matter which may happen to fall into the slot and clog up the course of said runner. However, should water become frozen in the slot or other matter become clogged up therein, so as to cause injury or break the nose of the runner 6, I might construct the runner with the nose hinged to the upper part thereof, as shown in Fig. 6, and provide a rubber cushion 40, secured between sockets 41, one of which sockets is secured to the rear end of the nose and the other to the front end of the lower part of the runner 6, such ends being connected by the strap 42, having pins 43 projecting loosely through slots 44 in the said ends. It will be seen that this construction will render the nose of the runner 6 flexible and avoid liability to breakage should said runner meet with any stubborn resistances in the slot. Again, if the runner should very suddenly strike the roller 10 in the top of the standard 11, or if for any reason there should be difficulty in raising the standard 11, this construction of nose would prevent breakage or injury to the roller 10.

From the drawings it will be seen that I show several forms of fixed contact-box and pivoted standards. In Figs. 1, 13, and 14 I show that form of box having its standard pivoted on a line parallel with the track and designed to be raised and lowered by a plowshare-shaped runner and guide, Fig. 3. In this form of box and standard I show the C-shaped contact-piece 13 solidly connected to the axis 45, said axis extending through the packed bearing 14 into the contact-box proper, 16, and having secured to its end the contact-blade 17, which is designed to engage with the springs 18 of the contact-block 20. The C-shaped contact-piece 13 and axis 45 are thoroughly protected by the insulation 46, which incloses them on all sides except the inner surface of the block 13, through which the collector 12 is carried, and a slot 47 is formed from side to side in the standard 11, extending outwardly to its periphery, designed to afford passage for the strip 27, secured to the collector 12. The standard 11 is constructed, preferably, in a semicircular shape about its lower edge and has a slight cavity 48 in its back, into which the top of the box 15 may extend, so that when said standard is raised its periphery will occupy and fill opening which would otherwise exist and allow the standard to be raised high enough to bring the C-shaped contact 13 on a line perpendicular with the axis 45, thereby leaving no opening in the street, when raised or lowered, for stones, dirt, or other matter to fall into the contact-box. The standard 11 swings upon the packed bearing 14 in each side of the box 15, said bearings being provided with bushings made, preferably, of graphite, rendering said bearings self-lubricating and water-tight.

It will be necessary, in order to prevent arcing and loss of current in the contact-box 16, to thoroughly insulate the contact-blade 17, springs 18, and contact-block 20 from the sides of the box 16. For this purpose I provide a wooden box 50, constructed as shown in Fig. 24, having the contact-block 20 arranged therein as shown, and designed to be placed within the contact-box 16, filled, preferably, with oil and having its wooden cover 51 fitted on the top, over which is placed the cover 52 of the box 16, to which said cover is secured by the screws 53. The contact-block 20 in the wooden box 50 is tapped by the insulated wire 21, leading from the main cable 19, said block only being constantly alive while current passes through the main cable 19 until the standard 11 is raised by runner 6, when a solid connection is made through blade 17 and axis 45 to the C-shaped contact-block 13, from which the current is taken up by the collector 12.

In Figs. 5, 18, and 19 I show a form of contact-box the standard 11 of which is designed to be raised and lowered on a line at right angles to the track, and is so constructed that the roller 10 at the top of standard 11 will remain directly over the slot during the raising and lowering of the standard 11, requiring, therefore, that the runner 6 and the guide 9 form a straight path along the upper part of said runner, thereby avoiding the plowshare shape and twist at the point 26. (Shown in Figs. 1 and 3.) In this form of standard the slot or groove 47 is constructed lengthwise across the top of standard 11 and is constructed, preferably, U-shaped, as shown in Fig. 9, that the collector and its supports may be readily carried through. It will be understood that the contact-block 13, in the top of the standard 11, may be either C-shaped or U-shaped in either of the hereinbefore-described forms of standard 11, and may have its contact-surfaces formed convex in construction, Fig. 15, so that said surfaces will press firmly against the collector when passing through, or may be provided with rollers 57 and 57′, as shown in Figs. 16 and 17, respectively, which press firmly against the collector and yet permit of its being readily carried through with the least friction possible.

In Figs. 13 and 19 I show means for temporarily holding down the standard 11 to the surface of the track, consisting of a lock 58, pivoted between lugs 59 of the box 15, one end of said lock extending through the box 15 against the edge of the periphery of the standard 11, and having a spring 60, preferably of soft rubber, under it and forcing it upward into binding position against the standard 11. Consequently any attempt to raise the standard except by the runner 6 will cause the lock 58 to bind against said standard still more tightly. The nose of the runner 6 is constructed with the extreme end slightly-turned up, so that its under side will bear down upon the lock 58 and press it down, thus freeing it from binding against the standard before said runner begins to raise the standard.

Figs. 23 and 24 show a form of box having a standard designed to rotate upon an axis set at right angles to the track, the runner 6 raising and lowering the standard until it is level with the track, thus leaving no opening in the surface of the street for dirt, stones, or other matter to fall into the box; but should any such matter fall into the box when the standard has been raised, as in Fig. 24, said matter would be swept out again by the next rotation of the standard, the path in which the standard rotates in the box being radial. In order to prevent tampering with the box or tilting by a horse or any other weight coming upon one end of the standard when lowered to the surface of the track, I provide a bell-crank lock 61, pivoted at its angle in either side of the box, one arm, 62, of said lock extending into a radial groove 63, cut in the periphery of the standard 11, and the other arm, 64, extending outwardly into the slot, designed to be pushed forward by the nose of the runner 6, thereby throwing the arm 62 of the lock out of the radial groove 63 and allowing the roller 10 to be raised between the runner 6 and the guide 9. Upon the runner 6 leaving the box the standard is lowered to its proper level by the guide 9 at the rear of the car, and the lock 61 is thrown back into the radial groove 63 by the spring 65 abutting the angle of the lock 61.

In order that the standard 11 may not open suddenly on its axis when the runner strikes the roller 10, I provide a flat spring 66 within the box, Fig. 24, to bear against the periphery of the standard 11. This will insure the roller 10 being carried between the runner 6 and guide 9 and give a steady rotation to the standard 11.

To reduce friction upon the roller 10, I provide a sleeve 67, Fig. 15, on the spindle 68 on standard 11, and secure the roller 10 loosely thereon by the washer 69, the sleeve 67 being secured upon its spindle by the washer 70, over which the spindle is riveted down. It will be seen by reference to Fig. 20 that I secure a rubber bushing 106 upon the spindle 68, and a rubber washer 107 between the washers 69 and 70 upon said spindle, said bushing and washer serving to deaden sound as the runner 6 strikes roller 10

In Fig. 25 I show a twin conduit constructed in the devil-strip, but independent of the rails, and comprising two slots having their parts secured together at suitable points by the bracket 71, which has projections 38 formed upon its face and riveted down over the strips of the slots, in the manner shown in Figs. 11 and 12. The conduits or slots are constructed of a T-strip 72, Fig. 26, on the outside, an L-strip 73 on the inside, and a bottom strip 74. Referring to Fig. 26, I use a contact-box having a twin standard 11', provided with a twin U-shaped contact-block 13', through which the collector is carried, the twin rollers 10' being designed to be raised or lowered by a runner traveling in either groove of the twin conduit. The twin U-shaped contact-blocks 13' are solidly connected to the one axis 45', which revolves in the self-lubricating bearings 14', said axis being provided at its central point with the blade 17', designed to be thrown in and out of contact with the springs of the contact-block $20^2$, which is connected to main cable 19' by the insulated wire 21'. From this it will be seen that I provide one contact-box 16 for the double box 15 and twin standards 11, and that also only one main cable is used, thereby making the form of conduit and contact-box much more economical than the other forms hereinbefore described.

Now, returning to the collector 12, Fig. 7, we find that it is constructed in two parts, preferably of bronze or a hard composition of copper that it may not easily wear, the outer part 75 of which is preferably pointed at either end, so as to permit of its readily entering the C-shaped contact-block 13, through which it passes. To prevent arcing when the collector leaves the contact-block, I provide a magnet 77, Fig. 3, secured to the runner 6 and guide 9 and suitably insulated therefrom and having its poles at such distance apart on opposite sides of the collector 12 as to permit of the standard 11 passing between, said magnet being connected at one end to the collector and the other end leading to the propelling mechanism of the car. Fig. 8 shows an alternate form of collector consisting of a solid conductive rod 78 through its center longitudinally and a suitable insulating material 79 and having pointed ends 80, of a hard insulating material, the point of which may be tipped. These ends are designed to conduct the collector more readily through the contact-block 13. The rod 78 is provided with a series of contact-tips 81 on each side, formed, preferably, as shown in Fig. 10, and held nominally out of contact with the rod 78 by the rubber 79, cast around said rod, suitable recesses being formed in the rubber jacket to set the tips 81 in the inner ends or portions 88 of the tips 91 are designed to form a contact with the rod 78 when the collector passes through the contact-block 13, said block pressing upon the collector from each side and forcing the points 88 against rod 78 in succession, so that as one tip goes out of contact another comes in and thus causing two tips to be temporarily in contact as the change occurs from one to the other. This leaves at last one tip in contact at all times during passage of collector through contact-block 13.

The rod 78 has upwardly-extending portions 82, from one of which an insulated wire 32 leads to the propelling mechanism of the car, said portion 82 having insulation 83, both of which are secured between the insulated blocks 84 and 85 by the screws 86 and bushings 87. (See Fig. 9.) The block 85 is solidly secured to the part of the runner 9, from which, it will be seen, the rod of the collector 78 is thoroughly insulated and solidly supported.

Thus far I have described means of collecting current from the top of a standard raised but a short distance above the surface of the track.

In Fig. 21 I show arrangements for collecting the current from an overhead wire by using similar contact-blocks and collectors to those heretofore described. In this modified construction, which is but another adaptation of my principle, on the roof of the car I fix a standard 89, to the top of which one end of the link 90' is pivoted, the other end of said link engaging the downwardly-extending arm 91, rigidly secured to the collector 12, said collector provided near its ends with suitable guide-rollers 92, secured by straps 93, Fig. 22. The rollers 92 are designed to travel upon the wires 94, and said wires support suitable boxes 95, less than a car length apart and adapted to carry the U-shaped contact-block 13 and insulation 96, secured by screws 97. The box 95 is suspended above the car-roof by the insulator 98 on the main cable 19 and fixed by screws 99. The insulator 98 is provided with outwardly-extending arms 100, having holes 101, through which the lateral carrying-wires 102 are secured and serving to suspend said insulator above the car-roof from the poles 103. Suitable holes 104 are provided in the insulator 98, through which passes the main cable 19, a suitable tap being made from the main cable 19 to the U-shaped contact-block 13 by the insulated wire 21. (Shown in Fig. 22.) Thus it will be seen that a constant current is applied to the collector from the main cable suspended from the car-roof.

Having now fully described the parts involved in my invention, I will describe its manner of operation.

If a car in passing along a track approaches the contact-box 15, the runner 6, attached to the side of the car by the swinging arm 5, passes under the roller 10 and raises the standard 11, said standard turning upward upon its axis until a perpendicular position to the track is reached, the roller 10 rising up between the top of the runner 6 and the guide 9. Then the collector fixed to the car seeks out and passes through the contact-block 13, thoroughly insulated in the top of said standard but electrically connected to the axis of said standard. On the end of the said axis extending into the inner contact-box 16 is secured the contact-blade 17, which, when the standard is raised, is thrust between the openings 18 of the contact-block 20, which is tapped by the insulated wire 21 to the main cable 19, thereby forming a closed conduit for the current from the main cable to the collector, from whence it is carried to the motor of the car by the insulated wire 32. After the collector has passed through the contact-block 13 in the top of standard 11 the roller 10 follows down between the runner 6 and the guide 9 at the other end in like manner as it is raised when the car approaches, until the standard 11, to which it is attached, is lowered to the surface of the track. This operation throws the blade 17 out of contact with the springs 18, thereby cutting off the current at that box, but not until the next box is reached and its standard is raised by the runner and current is collected therefrom, thus making the contacts not only successive, but continuous.

What I claim, and desire to secure by Letters Patent, is—

1. In electric railways, a wooden box constructed to be filled with oil and located at the side of the track and having double ends, and a contact-block in each end provided with spring contact-points and a switch in said box, substantially as set forth.

2. In electric conduit railways, a contact-box at the side of the track and a pivoted standard therein, a wooden box constructed to hold oil and arranged at the side of the contact-box and spring contact-points at the ends of said oil-box and a switch therein, substantially as set forth.

3. In a conduit electric railway, a box and a rotating standard therein and a spring-pressed lock to engage the periphery of said standard, substantially as set forth.

4. In a conduit electric railway, a standard rotating in a box, and having a roller at its periphery, provided with a cushion secured upon its spindle, a car and a runner on the car engaging said roller and raising said standard, substantially as set forth.

5. In a conduit for electric railways, a rotating standard pivoted in a box and provided at its periphery with insulated contact-blocks between which a collector may pass, substantially as set forth.

6. In a conduit electric railway, rotating standards pivoted in boxes at points along the track, and insulated intermediate switches operated by said standards, said standards provided with contact-blocks having beveled contact-faces between which a collector is forced, substantially as set forth.

7. In a conduit for electric railways, rotating standard pivoted in a box at points along the track, said standards operating a switch and provided with contact-blocks having friction-rollers secured within the beveled contact-faces of said contact-blocks, said rollers reducing friction as the collector is forced between the same, substantially as set forth.

8. A vehicle, and a runner and a guide, rigidly connected and serving to raise and lower a radial standard, said guide being provided with a roller and spring at one end to afford an easy bearing and said runner having a tongue-point, substantially as set forth.

9. A vehicle, a runner constructed to travel in a slot and a guide coöperating with said runner to raise and lower contact-making mechanism along the track, the nose of the said runner being constructed with a dipping point, substantially as set forth.

10. A vehicle for a conduit electric railway, a pivoted standard, a runner suspended therefrom, and a flanged guiding-roller for said runner and a friction-roller secured upon the side of the nose of said runner, substantially as set forth.

11. A vehicle for a conduit electric railway, the swinging arms supported from the axle-boxes thereof and the runner and guide-rollers secured to said runner at suitable points guiding the same through the conduit-slots, and the friction-roller secured to the side of the runner and bearing upon the under surface of top plate of said slot, substantially as set forth.

12. A conduit for electric railways, a runner traveling in the slot of the conduit, and a guide, in combination with a current-collector rigidly secured to said runner and guide and insulated therefrom, substantially as set forth.

Witness my hand to the foregoing specification this 1st day of December, 1894.

JOHN B. LINN.

Witnesses:
H. T. FISHER,
S. Q. KERRUISH.